(12) United States Patent
Groskop et al.

(10) Patent No.: US 9,336,396 B2
(45) Date of Patent: May 10, 2016

(54) METHOD AND SYSTEM FOR GENERATING AN ENFORCEABLE SECURITY POLICY BASED ON APPLICATION SITEMAP

(75) Inventors: Michael Groskop, Tel Aviv (IL); Roy Zisapel, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 590 days.

(21) Appl. No.: 12/911,373

(22) Filed: Oct. 25, 2010

(65) Prior Publication Data

US 2012/0102541 A1     Apr. 26, 2012

(51) Int. Cl.
*G06F 17/00* (2006.01)
*H04L 29/06* (2006.01)
*G06F 21/57* (2013.01)

(52) U.S. Cl.
CPC ........ *G06F 21/577* (2013.01); *H04L 29/06904* (2013.01); *H04L 63/0236* (2013.01); *H04L 63/0263* (2013.01); *H04L 63/1433* (2013.01); *G06F 2221/2141* (2013.01)

(58) Field of Classification Search
CPC ....... G06F 21/50; G06F 21/55; G06F 21/552; G06F 21/554; G06F 21/577; H04L 63/14–63/1443; H04L 29/06904
USPC .................. 726/1, 25; 707/709, 710, 803, 804
See application file for complete search history.

(56) References Cited

U.S. PATENT DOCUMENTS

| | | | |
|---|---|---|---|
| 6,311,278 B1 | 10/2001 | Raanan et al. | |
| 7,096,503 B1 * | 8/2006 | Magdych et al. | ............... 726/25 |
| 7,313,822 B2 | 12/2007 | Itzhak | |
| 7,472,413 B1 * | 12/2008 | Mowshowitz | ................... 726/10 |
| 7,614,085 B2 * | 11/2009 | Ben-Itzhak | ............. G06F 21/55 726/1 |
| 7,934,253 B2 * | 4/2011 | Overcash et al. | ............... 726/22 |
| 2005/0251863 A1 * | 11/2005 | Sima | ............................... 726/25 |
| 2006/0282494 A1 * | 12/2006 | Sima | ....................... H04L 63/20 709/200 |

* cited by examiner

*Primary Examiner* — Daniel Potratz
(74) *Attorney, Agent, or Firm* — M&B IP Analysts, LLC (57) ABSTRACT

A system for generating a security policy for protecting an application-layer entity. The system comprises a security sitemap generator for generating a security sitemap of a protected application-layer entity, the security sitemap is stored in a first repository connected to the security sitemap generator; and a policy builder for generating a security policy for the application-layer entity based on the security sitemap, the security policy is stored in a second repository connected to the policy builder, wherein the security policy includes a plurality of enforcement rules for at least one of a resource, a group of resources, and a client-side input parameter of at least a portion of the protected application-layer entity.

28 Claims, 8 Drawing Sheets

METHOD AND SYSTEM FOR GENERATING AN ENFORCEABLE SECURITY POLICY BASED ON APPLICATION SITEMAP

TECHNICAL FIELD

This invention generally relates to secure web applications, and more particularly to generate enforceable security policies for protection of web applications.

BACKGROUND OF THE INVENTION

A significant problem facing the Internet community is that web sites and web applications are vulnerable to malicious attacks. A web application is executed by a server and is accessed by a client over a network, e.g., the Internet. To be protected, companies heavily invest in security solutions, such as anti-virus software and firewalls. However, as security solutions become more and more advanced so do web attacks. Web attacks may be in form of viruses, worms, Trojan horses, script-based, system intrusions, and many others. Such attacks allow the attacker to control computers, access confidential information, and destroy valuable data.

Figure 1:
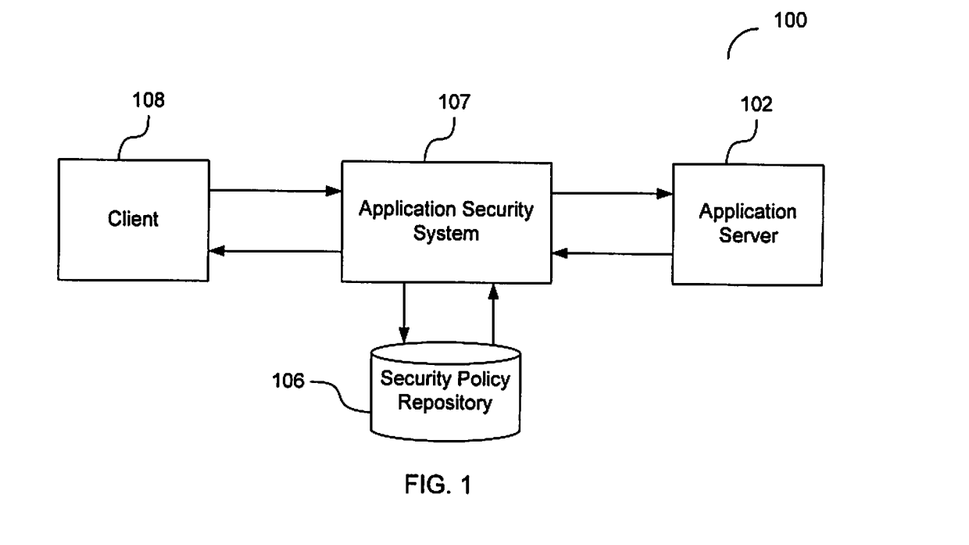
FIG. 1 illustrates a typical deployment of an application level security system.

As illustrated in FIG. 1, an application level security system 107 is typically deployed between an application server 102 (executing the protected web application) and a client 108. The security system 107 is adapted to identify malicious traffic that contains potential attacks. Once an attack is detected, the security system 107 may either block incoming traffic to the server or modify the traffic. The security system 107 should process legitimate traffic and relay such traffic to the application server 102.

The security system 107 identifies and blocks malicious traffic using a security policy stored in a repository 106. Specifically, the security system 107 receives a request from the client 108 and checks if the request is compliant with a security policy stored in the repository 106. If so, the security system 107 forwards the request to the application server 102; otherwise, the request is either blocked or manipulated according to the security policy. The security system 107 also processes responses received from the application server 102, that are responsive to the client's requests. A response is also checked against the security policy to determine whether the response is valid. If the response is compliant with to the policy, it is forwarded to the client 108; otherwise, the response is either blocked or manipulated (e.g., replaced with an informational response). The actions for handling responses are also defined in the security policy.

As can be understood from the above discussion, the security policy has an important role in the protection of web applications. Thus, it is important to define and maintain a security policy that, on the one hand, would efficiently block attacks, and, on the other, would not block legitimate traffic.

Some prior art solutions suggest that a user manually define a security policy (e.g., a system administrator). This type of security policy includes blocking rules against well-known vulnerable patterns and/or vulnerable application paths. However, such solutions cannot provide efficient protection, as some attacks are not always characterized by well-known patterns or paths. Further, the protected applications are dynamically changed by programmers and the system administrator often does not have full control over all these rapidly occurring changes, many of them being reported afterwards, if at all. Thus, the policy is statically enforced, and thus the protected applications remain vulnerable.

Other solutions suggest periodically checking the compliance of the application against a user-defined security policy and if flaws in the application are detected, then the enforced policy is updated. Typically, the monitoring is performed by sources (such as network and security scanners) that provide flaw reports. The reports are then consolidated with the user-defined policy. The disadvantage of such solutions is that the scanners cannot cover the entire application, as some application's resources cannot be accessible. Further, flaws that can be abused by zero-day attacks cannot be detected by the scanners. Hence, the scanners in most cases do not provide a complete flaw report, and thus the protected web applications remain vulnerable.

It would be, therefore, advantageous to provide a solution for generating an adaptive enforceable security policy for efficient protection of web applications.

SUMMARY OF THE INVENTION

Certain embodiments of the invention include a system for generating a security policy for protecting an application-layer entity. The system comprises a security sitemap generator for generating a security sitemap of a protected application-layer entity, the security sitemap is stored in a first repository connected to the security sitemap generator; and a policy builder for generating a security policy for the application-layer entity based on the security sitemap, the security policy is stored in a second repository connected to the policy builder, wherein the security policy includes a plurality of enforcement rules for at least one of a resource, a group of resources, and a client-side input parameter of at least a portion of the protected application-layer entity.

Certain embodiments of the invention further include a method for generating a security policy for protecting an application-layer entity. The method comprises generating a security sitemap of a protected application-layer entity; storing the security sitemap in a first repository; generating a security policy for the application-layer entity based on the security sitemap, the security policy includes, in part, a plurality of enforcement rules for at least one of a resource, a group of resources, and a client-side input parameter of at least a portion of the protected application-layer entity; and providing the security policy to an application layer security system for enforcement of the security policy.

Certain embodiments of the invention also include a system for generating a security sitemap of an application-layer entity. The system comprises a crawler for generating and sending requests to a server executing the application-layer entity, the crawler further processes responses received from the server to generate subsequent requests responsive of the received responses; an analyzer for processing the requests provided by the crawler to produce the security sitemap; and a first repository for storing the security sitemap.

Certain embodiments of the invention also include a system for generating a security sitemap of an application-layer entity. The system comprises a file system crawler installed in a server executing the application-layer entity, wherein the file system crawler parses file system files and provides at least one of a list of resources, client-side input parameters, and allowable client-side input parameters' values of the application-layer entity; a parser for parsing the list of resources provided by the file system crawler; an analyzer for processing the parsed information for producing the security sitemap; and a first repository for storing the security sitemap.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with some of the principles of the invention, an enforceable security policy is generated based on a security sitemap delineating the protected web application and its environment. The security sitemap contains an application's folders and their structure, application resources, resources' attributes, security properties, possible and allowable user inputs, allowable responses, and so on.

In order to learn the complete structure of the protected application, disclosed are different techniques that can be applied separately or in combination, to generate a security sitemap for the web application. It should be noted that as the security policy to be enforced is based upon the sitemap, it is essential that the generated sitemap would include a complete representation of the application.

Figure 2:
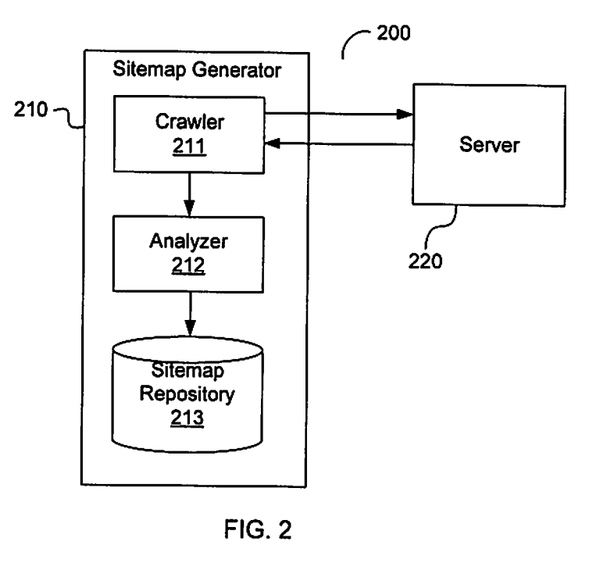
FIG. 2 is a block diagram of a system for generating a security sitemap using a crawler in accordance with an embodiment of the invention.

FIG. 2 shows an exemplary and non-limiting block diagram of a system 200 for generating a security sitemap using a crawler in accordance with an embodiment of the invention. In the system 200, a sitemap generator 210 is connected to an application server 220.

The sitemap generator 210 generates a security sitemap of a protected web application executed over the server 220 and includes a crawler 211, an analyzer 212, and a sitemap repository 213. The crawler 211 generates requests to the server 220 and processes responses received therefrom in order to generate subsequent requests. The requests generated by the crawler 211 are forwarded to the analyzer 212 for generating the sitemap of the protected application. The security sitemap is saved in the sitemap repository 213, which may be any tangible readable medium for storing digital data.

In an embodiment of the invention, the crawler 211 sends requests to each web page, web service, and web form of the protected web application. The crawler 211 can process both static responses (e.g., HTML pages) and dynamic client content, such as Javascripts to retrieve all accessible resources and attributes of the web application. The crawler 211 may further probe the protected application during different hours of the day and days of the week. This allows generating a security policy that would be defined with a time dimension.

In order to output a complete sitemap, the crawler 211 generates and sends requests to capture different scenarios in the operation of the web application. In one embodiment, the crawler 211 generates requests on behalf of different user types, e.g., administrator, guest, etc., as each user type is set with different permissions for accessing a web site. The crawler 211 may be provided with username and password values to generate such requests. The crawler 211 also simulates different types of clients, (e.g., mobile user, a standard web browser, and so on) under different operational conditions by setting a "user-agent" header value in a simulated HTTP transaction accordingly. It should be appreciated that for different client types, different application resources may be accessible.

In another embodiment, the requests are generated with different parameter values to determine the possible user inputs. Possible input values may be provided in the response (e.g., exact URLs may include a fixed set of parameter values). When such values are not provided, during the response processing by the crawler 211, the parameter name and context are examined to suggest different values to be included as the parameter value in subsequent client requests. Thus, according to this embodiment, several requests are generated for a single resource to inspect the responses for each provided input.

The analyzer 212 receives, from the crawler 211, submitted requests and based, in part, on the received information generates the sitemap. Specifically, the requests are analyzed to determine at least a list of the application folders and their structure; mapping between application resources and the application folders; a list of allowable HTTP methods and resources associated with such methods; and client-side input parameters and their allowable values. The client-side input parameters are listed and associated with the resources.

The resources include, but are not limited to, a list of web pages, web forms, web services, style-sheet files, script files, images, Flash clips, client-side input parameters, and the like. A client-side input parameter includes, but is not limited to, a form field, a query parameter, a path parameter, a cookie, and so on. The analyzer 212 identifies the type of values that such parameters can accept from the requests (e.g., textual, numeric). When a deterministic value for a parameter cannot be determined, multiple requests are generated, by the crawler 211, to a single resource, each such request may include a query with a specific value. The analyzer 212 determines a parameter's value based, in part, on the context of the parameter within the resource and application. As an example, a username field can be limited to a maximum size (e.g., 25 characters).

As mentioned above, in certain instances, it is possible to retrieve a complete set of possible input values, e.g., combobox, radio button. Thus, requests with all acceptable values are generated and the analyzer 212 identifies the complete list of acceptable values from the generated requests. Then a complete list of possible acceptable values for a client-side input parameter is associated with the parameter.

In one embodiment of the invention, the analyzer 212 processes responses provided by the crawler 211 merely to detect existence of predefined rule-matching content. For example, identifying a credit card number in a response is very meaningful security related information.

In an embodiment of the invention, the analyzer 212 can identify common XML structures in requests, while accessing each resource. For each such XML file, a schema can be generated for the different XML structures. The security policy can be utilized to enforce the XML schemas.

The analyzer 212 outputs a security sitemap that delineates at least the application's folder structure, application resources, valid and allowable client-side input parameters and their values, mapping between resources to application folders, mapping between resources to parameters, and so on. The format of the generated sitemap may be, but is not limited to, an extensible markup language (XML) format.

Figure 3:
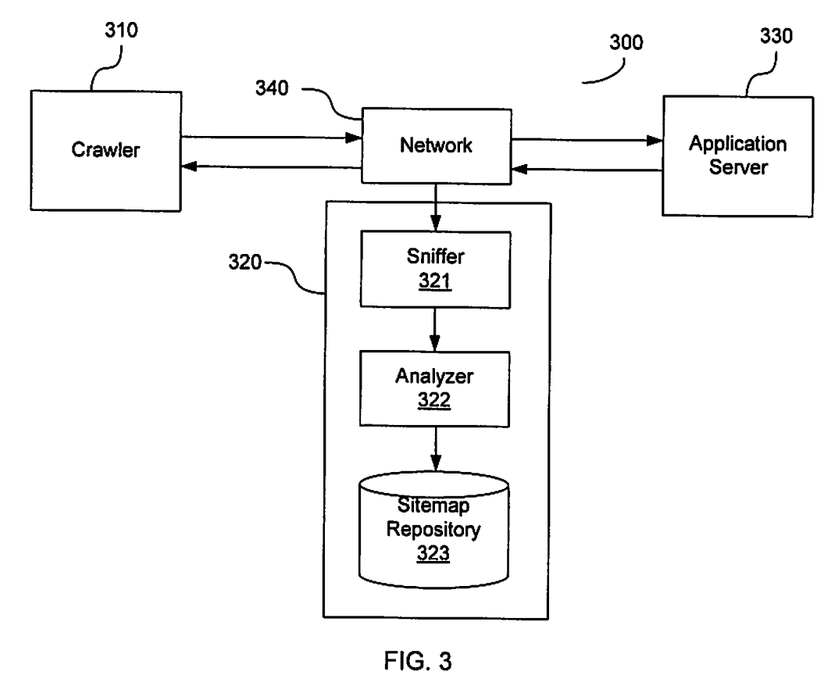
FIG. 3 is a block diagram of a system for generating a security sitemap using a sniffer in accordance with an embodiment of the invention.

FIG. 3 shows an exemplary and non-limiting block diagram of a system 300 for generating a security sitemap in accordance with another embodiment of the invention. The system 300 includes a crawler 310 that queries an application server 330 through a network 340. The network 340 may be, but is not limited to, a local area network, a wide area network, the Internet, a combination thereof, and the like. In the line of traffic between the crawler 310 and server 330, there is connected the sitemap generator 320 being adapted for generating a sitemap of a protected application executed over the server 330. The sitemap generator 320 includes a sniffer 321 for sniffing traffic flows through the network 340 and forwarding the traffic to the analyzer 322. The analyzer 322 processes the incoming traffic to generate a sitemap of the protected entity. The operation of the crawler 310 and analyzer 322 is as described in detail above with reference to FIG. 2. The generated sitemap is saved in the sitemap repository 323.

Figure 4:
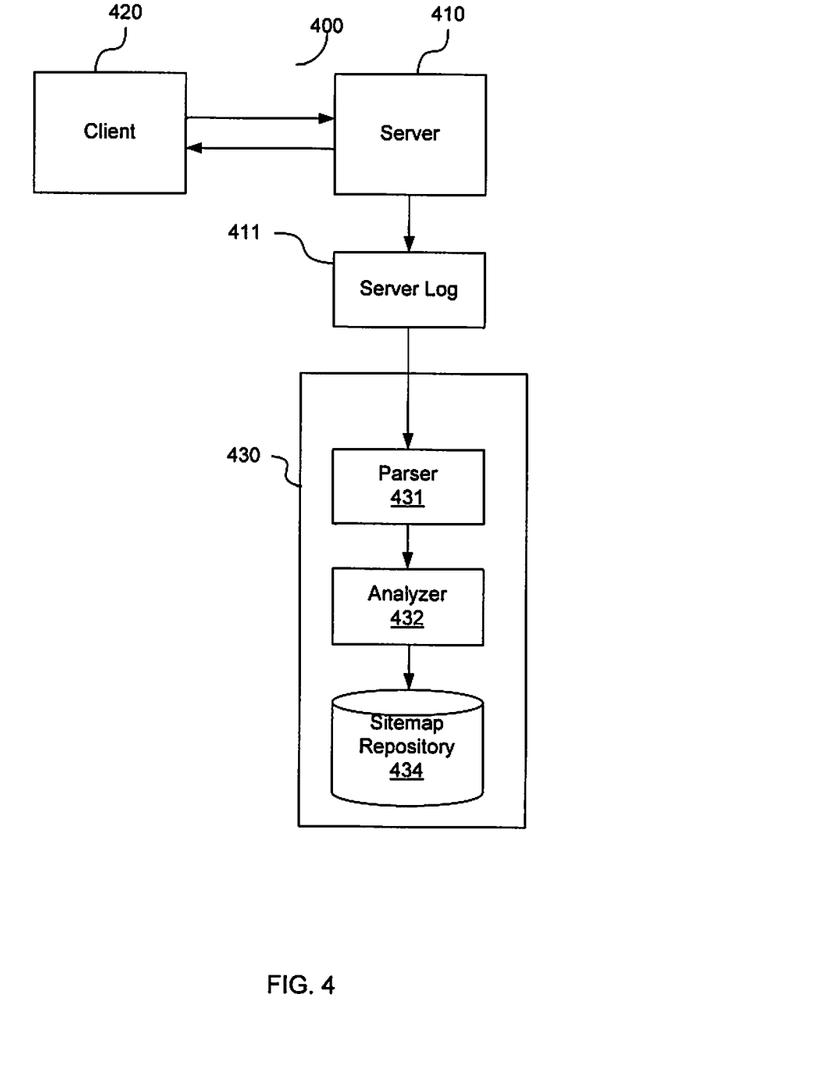
FIG. 4 is a block diagram of a system for generating a security sitemap using a server log in accordance with an embodiment of the invention.

In accordance with another embodiment of the invention, illustrated in FIG. 4, a security sitemap of the protected application can be generated by processing a log file 411 of a server 410. The log file 411 includes an entry for each client's 420 request processed by the server 410. According to this embodiment, the sitemap generator 430 parses the log file 411 using a parser 431 to identify resources of the protected application (executed over the server 410) that were accessed by the client 420. In accordance with another embodiment, the parser 431 processes a server's configuration file, e.g., an Apache configuration file. The parsed information is processed by the analyzer 432 to generate the sitemap as described in detail above. The generated sitemap is saved in the repository 434. In an embodiment of the invention, the analyzer 432 can generate statistical information as to the access to the protected web application. For example, an average number of requests to a specific resource during 24 hours, total number of requests by a client to the application, and so on.

Figure 5:
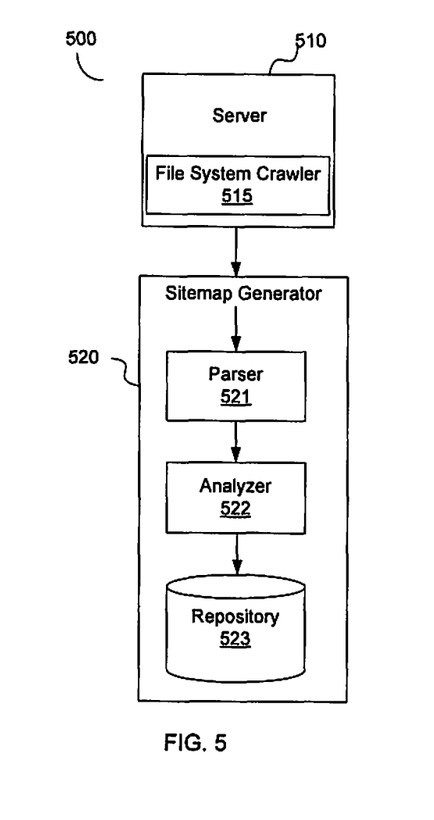
FIG. 5 is a block diagram of a system for generating a security sitemap using a file system crawler in accordance with an embodiment of the invention.

FIG. 5 shows an exemplary and non-limiting block diagram of a system 500 for generating a security sitemap in accordance with another embodiment of the invention. In this embodiment, the server 510 includes a server file system crawler 515 that provides a complete list of resources and scripts in a protected application executed by the server 510. The file system crawler 515 parses the actual application resources (e.g., .asp files) and retrieves the type of acceptable parameters and their compatible value ranges. A sitemap generator 520 parses, by means of a parser 521, the information provided by the crawler 515. The analyzer 522 analyzes the parsed information to determine at least all the presumable accessible resources and the allowable type, value, and size of each parameter. The operation of the analyzer 522 is described in detail above with reference to FIG. 2. A sitemap generated by the analyzer 522 is saved in the repository 523.

The file system crawler generates a detailed sitemap including actual application scripts in a relatively short time. Further, any change in the application content or structure can be identified automatically, thereby enabling adaptively updating the secure policy. Thus, the policy may be enforced prior to any actual real client traffic accessing the new application content.

It should be appreciated that providing a detailed sitemap using the above-described processes allows generating an enforceable security policy; such policy should preferably include an enforcement rule for each resource or a group of resources an input user parameter in the application. Thereby, a sitemap that provides a complete coverage of the application ensures a better protection.

Figure 6:
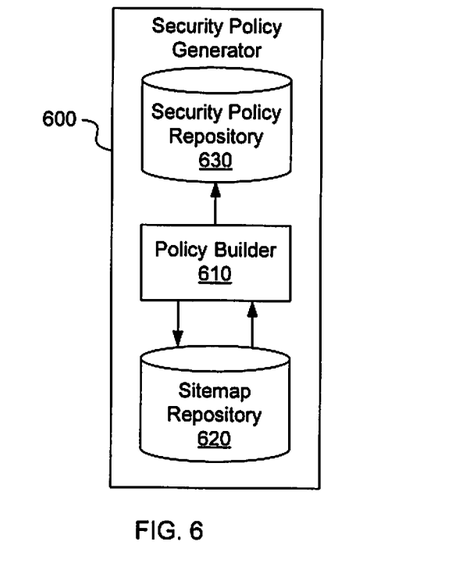
FIG. 6 is a block diagram of a security policy generator in accordance with an embodiment of the invention.

FIG. 6 shows an exemplary and non-limiting block diagram of a security policy generator 600 implemented in accordance with an embodiment of the invention. The system 600 is based on a policy builder 610 that produces a security policy for a protected web application using its respective sitemap saved in a sitemap repository 620. In one embodiment, the sitemap is generated using one or a combination of the techniques described in detail above. In another embodiment, the sitemap may be generated by a third party tool and saved in the repository 620.

The security policy generated by the policy builder 610 is in a form of rules and restrictions applied to each of the resources of the protected application. The resulting policy is saved in the security policy repository 630. The repositories 620 and 630 may be any tangible readable medium for storing digital data. Further, the generated security policy is in a format that can be accessed by application security systems (e.g., system 107) for the purpose of enforcing the policy. Thus, it should be noted, that although the security policy generator 600 is illustrated as a standalone component, it can be integrated with an application security system, such as the system illustrated in FIG. 1. In addition, the policy generator 600 may be integrated with any of the sitemap generators illustrated in FIGS. 2, 3, 4 and 5.

Figure 7:
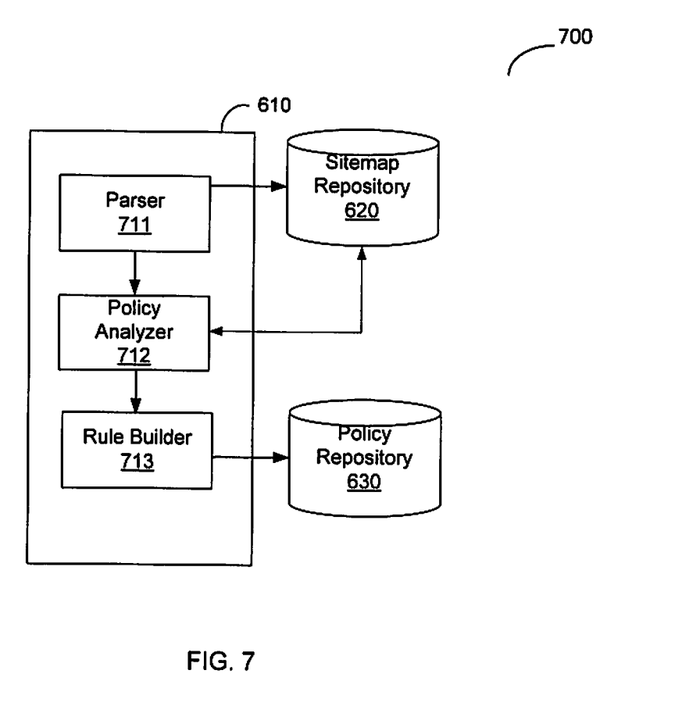
FIG. 7 is a block diagram of a policy builder in accordance with an embodiment of the invention.

FIG. 7 shows an exemplary and non-limiting block diagram of the policy builder 610 implemented in accordance with an embodiment of the invention. The policy builder 610 comprises a parser 711 for parsing the sitemap to determine resources contained therein, a policy analyzer 712 for processing the parsed information, and a rule builder 713 for generating the rules based on the inputs provided by the policy analyzer 712.

The policy analyzer 712 explicitly defines one or more enforcing rules for each resource of the application. The enforcing rules determine whether or not the resource can be accessed by a client by inspecting each client message to validate that there is no request trying to access or retrieve information from a resource which should not be accessed. With this aim, the secure policy, generated by the policy analyzer 712 defines which application resources are allowed to be accessed (white list) or which are not (black list). In order to determine the rules to be enforced the policy analyzer 712 can also utilize information provided by a user of the security system and/or learn information about, for example, the vulnerability of each resource, how a resource can be manipulated, and so on.

In accordance with an embodiment of the invention, if the sitemap includes different roles for different types of application users or roles (e.g., guest and administrator), then different security policy and/or enforcing rules may be defined for different roles, i.e., type of users accessing the application. For example, an administrator may access a pricing configuration page while an attempt to reach this page by non-administrator users would be blocked. Thus, in accordance with an embodiment of the invention, for the same application, different security policies may be generated each of which differs per user type.

In another embodiment of the invention, the policy builder 610 can also determine which resource can be accessed at certain hours of the day and days of the week. For example, a resource can be accessed only during business hours. In yet another embodiment of the invention, if the sitemap includes references to different user-agent header values, the policy builder 610 generates different policies for different types of clients based on the different types of "user-agent" header values. For example, a different policy is generated for a browser (client) of mobile device or a PC.

In another embodiment, if the sitemap details a set of resources that contain sensitive information as identified in the response, the policy builder 610 generates a rule to mask the sensitive information (e.g., credit card numbers) in the response. As mentioned above, the sensitive information is determined using predefined rule matching content. In another embodiment, the policy analyzer 712 can generate rules for schema validation of a client side XML based input, if such schema is included in the security sitemap. In certain embodiments of the invention, the policy analyzer 712 can analyze the security sitemap to generate policy rules based on parameters listed and associated with resources. For example, if one of the resources listed in the sitemap is a web page "login.aspx" including parameters, such as "username" and "password," the policy analyzer 712 generates a Brute Force attack prevention rule on this web page, to prevent Brute Force attacks from guessing a password on the login page. It should be noted that various embodiments for generating rules are examples and that other types of enforcing rules can be defined based on the content of the security sitemap.

The rule builder 713 receives from the policy analyzer 712 at least a resource name, action (e.g., allow, block, or modify a request), and action properties (e.g., user type, enforceable hours, etc.) and generates a rule, for example, in a format of a regular expression. The rule builder 713 further groups all the rules to output the security policy.

Figure 8:
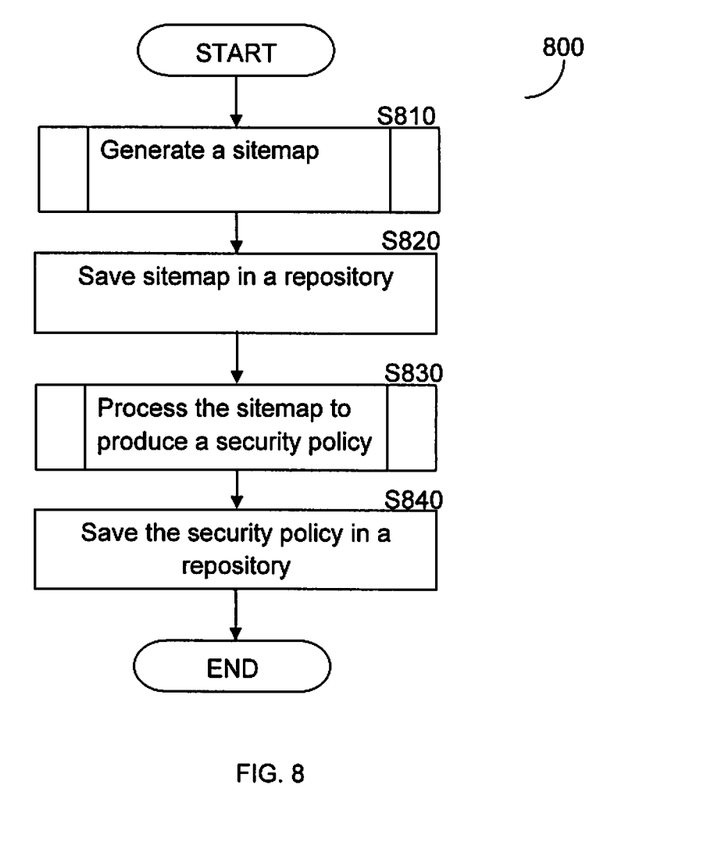
FIG. 8 is a flowchart describing the process for generating an enforceable security policy in accordance with an embodiment of the invention.

FIG. 8 shows an exemplary and non-limiting flowchart 800 describing the process for generating an enforceable security policy in accordance with an embodiment of the invention. At S810, a security sitemap that describes each resource in the protected entity is generated. Specifically, the security sitemap includes a list of folders and their structure, resources, client-side input parameters, and allowable parameter values of the protected application. In accordance with an embodiment of the invention, the security sitemap can be generated using one or more of the techniques described above. Alternatively, the sitemap may be retrieved from an external source, e.g., as defined for example by the sitemap.org protocol. At S820, the generated security sitemap is saved in a sitemap repository. At S830, the sitemap is processed by a security policy generator to produce at least one security policy for the protected application. In should be noted that the various policies may be generated for different user types and/or different times. The policy includes a list of resources allowed to be accessed (white list) and a list of resources that cannot be accessed. In accordance with an embodiment of the invention, the sitemap is generated as described in detail above. At S840, the security policy or policies for the protected application are stored in the repository. Thereafter, an application security system can access the policy stored in the repository to enforce the rules defined therein. That is, a security system checks if the received request is compliant with a security policy stored in the repository. If so, the security system forwards the request to the application server; otherwise, the security system either blocks or manipulates the request according to the security policy.

Portions of the invention described herein references a specific embodiment where the security policy is generated for a web application. Other embodiments would be apparent to one of ordinary skill in the art. Specifically, security policies based on sitemaps generated according to teachings of the present invention can be created for web services, service oriented architectures (SOA), XML-RPC, SOAP, and the like.

The foregoing detailed description has set forth a few of the many forms that the invention can take. It is intended that the foregoing detailed description be understood as an illustration of selected forms that the invention can take and not as a limitation to the definition of the invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A system for generating a security policy for protecting an application-layer entity, comprising:
   a processing unit; and
   a memory coupled to the processing unit the memory containing instructions that, when executed by the processing unit, configures the system to operate:
   a role specific security sitemap generator configured to generate a security sitemap of a protected application-layer entity, wherein the role specific security sitemap generator is configured to generate a security sitemap for each different type of role selectable from a plurality of defined roles in which the application-layer entity can operate,
      wherein the role specific security sitemap generator is further configured to generate requests based on a selected defined role of the application-layer entity, send the generated requests to a server executing the protected application-layer entity, process responses received from the server responsive to the server receiving the generated requests, generate subsequent requests in accordance with the selected defined role responsive to the received responses, and analyze each of the generated requests and the subsequent requests to produce the role specific security sitemap in accordance with the selected defined role, wherein the generated requests and subsequent requests simulate a client accessing the protected application-layer entity operating in the selected defined role, wherein the generated security sitemap completely delineates a structure of the protected application-layer entity associated with the defined role;

a first data repository configured to save at least the generated role specific security sitemap, wherein the first data repository is coupled to the role specific security sitemap generator;

a policy builder configured to generate a security policy corresponding to the selected defined role of the protected application-layer entity using at least the generated role specific security sitemap, wherein the security policy includes a plurality of enforcement rules for at least one of a resource, a group of resources, and a client-side input parameter of at least a portion of the protected application-layer entity; and a second data repository configured to save the security policy, wherein the second data repository is connected to the policy builder.

2. The system of claim 1, wherein the first data repository is also connected to the policy builder.

3. The system of claim 2, wherein the second data repository is also connected to an application-level security system for enforcing the security policy.

4. The system of claim 3, wherein the protected application-layer entity is at least any one of: a web application, a web service, and a service oriented architecture (SOA).

5. The system of claim 1, wherein the role specific security sitemap comprises at least: a list of folders of the protected application-layer entity and their structure and the resources of the protected application-layer entity, wherein for each of the resources the role specific security sitemap includes client-side input parameters' names, allowable client-side input parameters' types, client-side input parameters, and allowable client-side input parameters' values of the protected application-layer entity, wherein a client-side input parameter includes at least a form field, a query parameter, a path parameter, and a cookie.

6. The system of claim 5, wherein the selected defined role is any one of: different types of clients, different types of users, and different time durations.

7. The system of claim 6, wherein the role specific security sitemap generator comprises:
a crawler configured to generate the requests and subsequent requests based on the selected defined role; and
an analyzer configured to process the requests and the subsequent requests provided by the crawler to produce the role specific security sitemap.

8. The system of claim 7, wherein the analyzer is further configured to process responses provided by the crawler to detect existence of a predefined rule matching content.

9. The system of claim 7, wherein the analyzer is further configured to process the requests to determine at least: a list of folders of the protected application-layer entity and their structure; a list of allowable HTTP methods and resources associated with the HTTP methods; and the allowable client-side input parameters' names, types, and values.

10. The system of claim 9, wherein the crawler is further configured to generate multiple requests, each request includes a different value of a client-side input parameter having an unknown value.

11. The system of claim 6, wherein the role specific security sitemap generator comprises:
a sniffer configured to intercept traffic flows between a crawler and a server executing the application-layer entity;

an analyzer configured to process requests in the intercepted traffic flows for producing the role specific security sitemap; and
the first data repository for storing the security sitemap.

12. The system of claim 11, wherein the crawler is further configured to process responses received from the server to generate subsequent requests responsive of the received responses.

13. The system of claim 12, wherein the analyzer is further configured to process the requests to determine at least: a list of folders of the protected application-layer entity, their structure and resources stored therein; a list of allowable HTTP methods and resources associated with the HTTP methods; client-side input parameters' names and allowable client-side input parameters' values; and the analyzer processes responses provided by the crawler to detect existence of a predefined rule matching content.

14. The system of claim 6, wherein the role specific security sitemap generator comprises:
a parser configured to parse a log file of a server executing the protected application-layer entity, wherein the log file includes an entry for each client request processed by the server;
an analyzer configured to process the parsed information for producing the role specific security sitemap; and
the first data repository configured to store the role specific security sitemap.

15. The system of claim 6, wherein the role specific security sitemap generator comprises:
a file system crawler installed in the server executing the protected application-layer entity, wherein the file system crawler provides at least a list of resources of the protected application-layer entity, client-side input parameters and allowable client-side input parameters' names, types, and values of the protected application-layer entity, wherein a client-side input parameter includes at least a form field, a query parameter, a path parameter, and a cookie;
a parser configured to parse the list of resources provided by the file system crawler;
an analyzer configured to process the parsed information for producing the role specific security sitemap; and
the first data repository configured to store the role specific security sitemap.

16. The system of claim 1, wherein the policy builder further comprises:
a parser configured to parse the Currently Amended security sitemap to determine resources contained therein;
a policy analyzer configured to process the parsed information to define the plurality of enforcement rules; and
a rule builder configured to generate for each defined rule a rule in format compliance with an application layer security system.

17. The system of claim 16, wherein the plurality of enforcement rules are defined for any one of: different types of clients, different types of users, and different time durations.

18. A method for generating a security policy for protecting an application-layer entity, comprising:
generating requests based on a defined role selected from a plurality of different types of roles in which the application-layer entity can operate;
sending the generated requests to a server executing the protected application-layer entity;
processing responses received from the server responsive to the server receiving the generated requests;

generating subsequent requests in accordance with the selected defined role responsive to the received responses, wherein the generated requests and subsequent requests simulate a client accessing the protected application-layer entity operating in the selected defined role;

analyzing each of the generated requests and subsequent requests to generate a role specific security sitemap of the protected application-layer entity, wherein the generated role specific security sitemap completely delineates structure and resources of the protected application-layer entity;

storing the role specific security sitemap in a first data repository;

generating a security policy corresponding to the role specific security sitemap generated in accordance with the selected defined role for the protected application-layer entity using at least the role specific security sitemap, wherein the security policy includes a plurality of enforcement rules for at least one of a resource, a group of resources, and a client-side input parameter of at least a portion of the protected application-layer entity; and providing the security policy to an application layer security system for enforcement of the security policy.

19. The method of claim 18, wherein the protected application-layer entity is at least any one of: a web application, a web service, and a service oriented architecture (SOA).

20. The method of claim 18, wherein the role specific security sitemap comprises at least a list of folders of the protected application-layer entity and their structure and resources stored therein, client-side input parameters, and allowable client-side input parameters' names, types and values of the protected application-layer entity, wherein a client-side input parameter includes at least one of a form field, a query parameter, a path parameter, and a cookie.

21. The method of claim 20, wherein the selected defined role is defined for any one of: different types of clients, different types of users, and different time durations.

22. The method of claim 21, wherein processing the requests further comprises:

analyzing the requests to determine at least: a list of the folders of the protected application-layer entity, their structure and resources stored therein; a list of allowable HTTP methods and resources associated with such methods; and the input parameters and allowable input parameters' names, types and values.

23. The method of claim 22, further comprises intercepting traffic flows from and to the server.

24. The method of claim 22, further comprises:

parsing a log file of a server executing the protected application-layer entity, wherein the log file includes an entry for each client request processed by the server.

25. The method of claim 22, further comprises:

crawling a file system of the server to populate at least a list of resources of the protected application-layer entity.

26. The method of claim 18, wherein generating the security policy further comprises:

parsing the role specific security sitemap to determine resources contained therein;

processing the parsed information to define the plurality of enforcement rules; and generating for each defined rule a rule in format compliance with the application layer security system.

27. The method of claim 26, wherein the plurality of compliance rules are defined for any one of: different types of clients, different types of users, and different time durations.

28. A non-transitory computer readable medium having stored thereon instructions for causing one or more processing units to execute the method according to claim 18.

* * * * *